(12) United States Patent
Seong et al.

(10) Patent No.: US 7,068,933 B2
(45) Date of Patent: Jun. 27, 2006

(54) APPARATUS AND METHOD FOR DETECTING BEAM POWER IN OPTICAL DRIVE

(75) Inventors: Pyong-yong Seong, Seoul (KR); Jong-koog Lee, Seoul (KR); Kun-soo Kim, Seoul (KR); Yong-jun Cho, Gyeonggi-do (KR); Sung-du Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 618 days.

(21) Appl. No.: 10/197,329

(22) Filed: Jul. 18, 2002

(65) Prior Publication Data

US 2003/0016426 A1 Jan. 23, 2003

(30) Foreign Application Priority Data

Jul. 18, 2001 (KR) ............................ 2001-43108

(51) Int. Cl.
*H04B 10/00* (2006.01)

(52) U.S. Cl. .................. 398/33; 369/53.6; 369/44.14

(58) Field of Classification Search ................ 398/91; 369/53.6, 44.14, 116, 122
See application file for complete search history.

(56) References Cited

U.S. PATENT DOCUMENTS

| | | | |
|---|---|---|---|
| 5,696,750 A * | 12/1997 | Katayama | 369/112.06 |
| 5,856,965 A * | 1/1999 | Tsuchiya et al. | 369/53.2 |
| 5,930,214 A * | 7/1999 | Kasahara et al. | 369/53.2 |
| 5,940,360 A * | 8/1999 | Choi | 369/112.04 |
| 5,995,473 A * | 11/1999 | Choi | 369/112.19 |
| 6,442,124 B1 * | 8/2002 | Chung et al. | 369/112.07 |
| 2002/0018419 A1 * | 2/2002 | Watabe | 369/53.26 |
| 2003/0076770 A1 * | 4/2003 | Hashimoto | 369/120 |

FOREIGN PATENT DOCUMENTS

| | | |
|---|---|---|
| JP | 10-124914 | 5/1998 |
| JP | 11-232682 | 8/1999 |
| JP | 2000-124746 | 4/2000 |
| JP | 2001-085786 | 3/2001 |
| JP | 2001-144552 | 5/2001 |
| KR | 1997-63086 | 9/1997 |
| KR | 1998-80241 | 11/1998 |

OTHER PUBLICATIONS

Japanese Office Action; mail date Dec. 22, 2005; Application No. 2002-208768.

* cited by examiner

*Primary Examiner*—David C Payne
(74) *Attorney, Agent, or Firm*—Staas & Halsey LLP

(57) ABSTRACT

An apparatus and method for detecting beam power generated by a plurality of light sources, using a single device. The apparatus includes a light-receiving unit that receives the beam power generated by one of a plurality of light sources, and an amplifying unit that selects a gain, amplifies the beam power received by the light-receiving unit according to the selected gain, and outputs the beam power amplified as a detected beam power. According to the apparatus and method, received beam power (or amplification gain) is amplified by a gain determined according to the characteristics of the respective light sources. Thus, it is possible to provide the detected beam power in consideration of a sufficient dynamic range for the each light source, thereby realizing effective APC.

43 Claims, 5 Drawing Sheets

APPARATUS AND METHOD FOR DETECTING BEAM POWER IN OPTICAL DRIVE

CROSS-REFERENCE TO RELATED APPLICATIONS

This application claims the benefit of Korean Patent Application No. 2001-43108 filed on Jul. 18, 2001, in the Korean Industrial Property Office, the disclosure of which is incorporated herein by reference.

BACKGROUND OF THE INVENTION

1. Field of the Invention

The present invention relates to an optical drive having a plurality of light sources, and more particularly, to an apparatus and method for detecting beam power generated by a plurality of light sources using a single device.

2. Description of the Related Art

It is possible to record or reproduce data on an optical medium using an optical drive having a plurality of light sources with different wavelengths. To record data on or reproduce data from two different discs, e.g., a disc classified as a compact disc (CD) and a disc classified as a digital versatile disc (DVD), in one optical drive, the optical drive is required to have separate light sources for a CD and a DVD. This is because the standard wavelengths required for recording data on or reproducing data from CDs and DVDs are different.

The output of light sources typically become reduced when the temperature rises in the optical drive. To solve this problem; the optical drives include an auto power control (APC) function of monitoring the beam power generated by a each light source to control the power of the light sources automatically.

The optical drive, however, monitors the beam power using one device. In other words, beam powers generated by the plurality of light sources are detected via one monitor photo diode (MPD). Therefore, the amplification gain (or sensitivity) of the MPD is set to be uniform for the plurality of light sources. However, if there are any differences between maximum beam powers generated by the plurality of light sources, it is difficult to ensure a dynamic range for detecting the beam power generated by each light source. For this reason, it is impossible to realize an APC that consistently provides the light power required.

Figure 1:
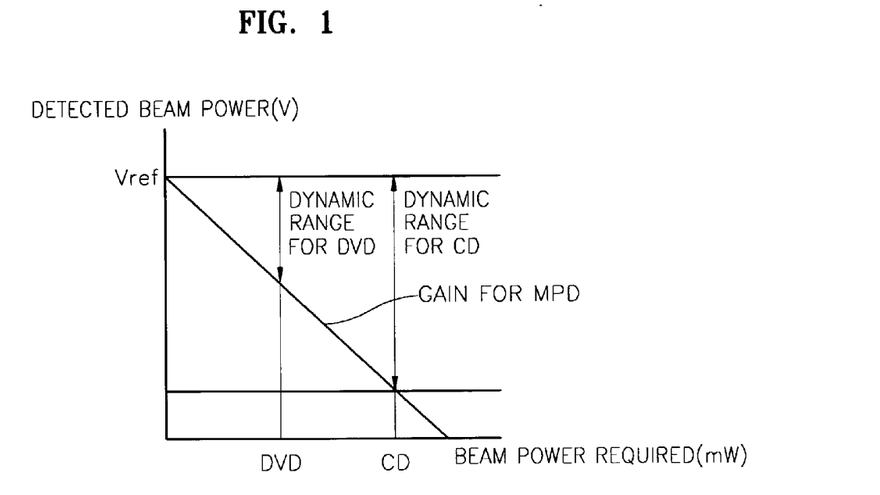
FIG. 1 is an illustration of a graph of a relationship between light power provided by an optical drive having light sources for both a CD and DVD, and the output of a monitor photo diode (MPD)

FIG. 1 is an illustration explaining a relationship between the beam power required in an optical drive having light sources for a CD and a DVD and the beam power in the optical drive detected by MPD. Referring to FIG. 1, the maximum beam power from the light source for a CD appears to be twice as large as that from the light source for a DVD, with the amplification gain of the MPD being the same for both light sources. In this case, the light source for a CD has a sufficient dynamic range for detecting the beam power, whereas the light source for a DVD has only half of the dynamic range required. To solve this problem, it has been suggested that monitor photo diodes (MPDs) that have amplification gains corresponding to the respective light sources be attached to an optical drive. However, a disadvantage of this technique is that the optical drive must be larger to encompass the multiple MPDs. Further, an installation of the multiple MPDs increases manufacturing costs.

SUMMARY OF THE INVENTION

An object of the present invention is to provide an apparatus and method for detecting the beam power in an optical drive having a plurality of light sources, using one device, wherein gains of detected beam powers of the plurality of light sources can be controlled to secure a sufficient dynamic range for detecting a maximum beam power required in a plurality of light sources.

Additional objects and advantages of the invention will be set forth in part in the description which follows and, in part, will be obvious from the description, or may be learned by practice of the invention.

Another object of the present invention is to provide an apparatus and method for detecting a beam power in an optical drive having a plurality of light sources, using one device, wherein an amplification gain of a generated beam power is determined for each respective light source.

To achieve the above and other objects, an apparatus and method for detecting a beam power in an optical drive having a plurality of light sources is provided. The apparatus may include a light-receiving unit that receives a beam power generated by one of the plurality of light sources, and an amplifying unit to select a gain, amplify the received beam power according to the selected gain, and output the amplified beam power as a detected beam power.

Further, the gain may be determined by a gain selection signal that can be generated differently depending on the type of optical medium used.

One of a first gain, determined by a variable resistance and a feedback gain resistance, and a second gain, determined by the variable resistance and another feedback gain resistance, may be selected as the gain in the amplifying unit.

One of a first gain, determined by a first variable resistance, a first invariable resistance, and a feedback gain resistance, and a second gain, determined by a second variable resistance, a second invariable resistance, and the feedback gain resistance, may be selected as the gain in the amplifying unit.

To achieve the above and other objects, an apparatus and method for detecting a beam power in an optical drive having a plurality of light sources includes: a light-receiving unit to receive light generated by one of the plurality light sources; a first amplifying unit to amplify beam power received by the light-receiving unit according to a first predetermined gain and to output amplified beam power; a second amplifying unit to amplify beam power, which is received by the light-receiving unit according to a second predetermined gain, and to output amplified beam power; and a switch to select and to output the beam power output from the first amplifying unit or the second amplifying unit, as the detected beam power.

The switch may be controlled in response to a selection signal that is generated differently according to the type of an optical medium used.

The first predetermined gain may be determined by a first variable resistance and a first feedback gain resistance, with the second predetermined gain being determined by a second variable resistance and a second feedback gain resistance.

In addition, to achieve the above and other objects, a method for detecting the beam power in an optical drive having a plurality of light sources is provided. The method includes receiving light generated by one of the plurality of light sources, amplifying the beam power received by a gain determined according to the type of optical medium used, and outputting the amplified beam power as a detected beam power.

Further, to achieve still another aspect of the above and other objects, a method for detecting the beam power in an optical drive having a plurality of light sources is provided. The method includes: receiving light generated by one of the plurality of light sources; amplifying the beam power received by a first predetermined gain, and outputting the same; amplifying the beam power received by a second predetermined gain and outputting the same; selecting the beam power amplified by the first predetermined gain or the beam power amplified by the second predetermined gain, according to the type of an optical medium used; and outputting the beam power selected as the detected beam power.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
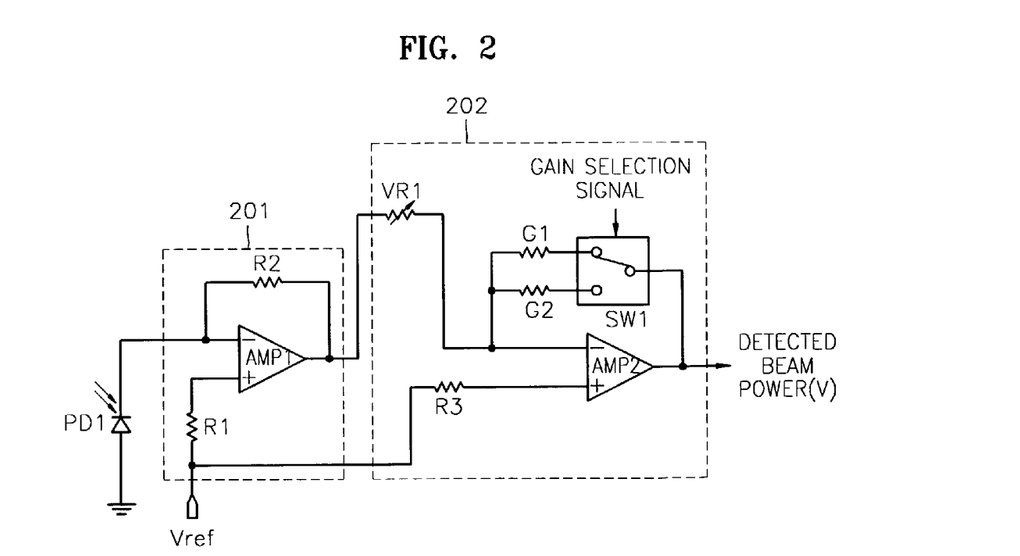
FIG. 2 is a diagram of a circuit of an apparatus for detecting the beam power in an optical drive according to an embodiment of the present invention.

FIG. 2 is a diagram of a circuit for detecting the beam power in an optical drive according to a first embodiment of the present invention. Referring to FIG. 2, the received beam power signal is amplified to a predetermined level according to a selected gain in response to a gain selection signal, and output as the detected beam power. The gain selection signal is generated based on the type of optical media present.

The circuit for detecting the beam power in an optical drive shown in FIG. 2 includes a photo diode PD1, a current-to-voltage amplifying unit (hereinafter, "I/V amplifying unit") 201 and an amplifying unit 202. The photo diode PD1 functions as a light-receiving unit that receives light generated by one of a plurality of light sources (not shown) included in an optical drive. If the optical drive operates with both a disc classified as a CD and a disc classified as a DVD, the plurality of light sources include at least a light source for the CD and a light source for the DVD, with the beam power generated by the light source for the CD or the light source for the DVD being received by the photo diode PD1.

The I/V amplifying unit 201 includes an amplifier AMP1 in which resistances R1 and R2 are connected to a feedback loop, and to which a reference voltage Vref is applied via an input terminal. The I/V amplifying unit 201 converts an electric current, corresponding to light received by the photo diode PD1, into a voltage and outputs the same.

An amplifier AMP2 is included in the amplifying unit 202. A bias resistance R3 is connected to an input terminal to which a reference voltage Vref is applied, and two feedback gain resistances G1 and G2 are selectively applied to a feedback loop in response to a gain selection signal similarly applied. Also, a variable resistance VR1 is connected to an input terminal to which a voltage output from the I/V amplifying unit 201 is applied in the amplifier AMP2. The variable resistance VR1 determines a gain for a voltage output from the I/V amplifying unit 201 together with one selected out of the feedback gain resistances G1 and G2.

The gain selection signal is generated depending on the type of an optical medium used and the feedback gain resistances G1 and G2 connected to the amplifier AMP2. For instance, a gain selection signal that enables the amplifier AMP2 to form a feedback loop using the feedback gain resistance G1, is generated when the beam power for an optical medium used in the optical drive requires an amplification according to a gain determined by the feedback gain resistance G1 and the invariable resistance VR1. On the other hand, a gain selection signal that enables the amplifier AMP2 to form a feedback loop using the feedback gain resistance G2, is generated when the beam power for an optical medium used in the optical drive requires an amplification according to a gain determined by the feedback gain resistance G2 and the variable resistance VR1.

As described above, in order to form the feedback loop in the amplifier AMP2 by such a gain selection signal, a switch SW1 is installed between the feedback loop gains G1 and G2 and an output terminal of the amplifier AMP2. The gain selection signal can also be generated by a servo controller (not shown) in the optical drive. The value of the variable resistance VR1 is determined so that light generated by each of the plurality of light sources has little scatter and linear characteristics.

Therefore, when the feedback gain resistance G1 is selected by a gain selection signal, the amplifying unit 202 amplifies a voltage corresponding to the beam power received to a predetermined level by a gain which divides the feedback gain resistance G1 by the variable resistance VR1, i.e. G1/VR1. When the feedback gain resistance G2 is selected by a gain selection signal, the amplifying unit 202 amplifies a voltage corresponding to the beam power received to a predetermined level by a gain which divides the feedback gain resistance G2 by the variable resistance VR1, i.e., G2/VR1. The amplified voltage is then output as the detected beam power and can be used for auto power control (APC). Accordingly, the detected beam power may be provided to the servo controller.

Figure 3:
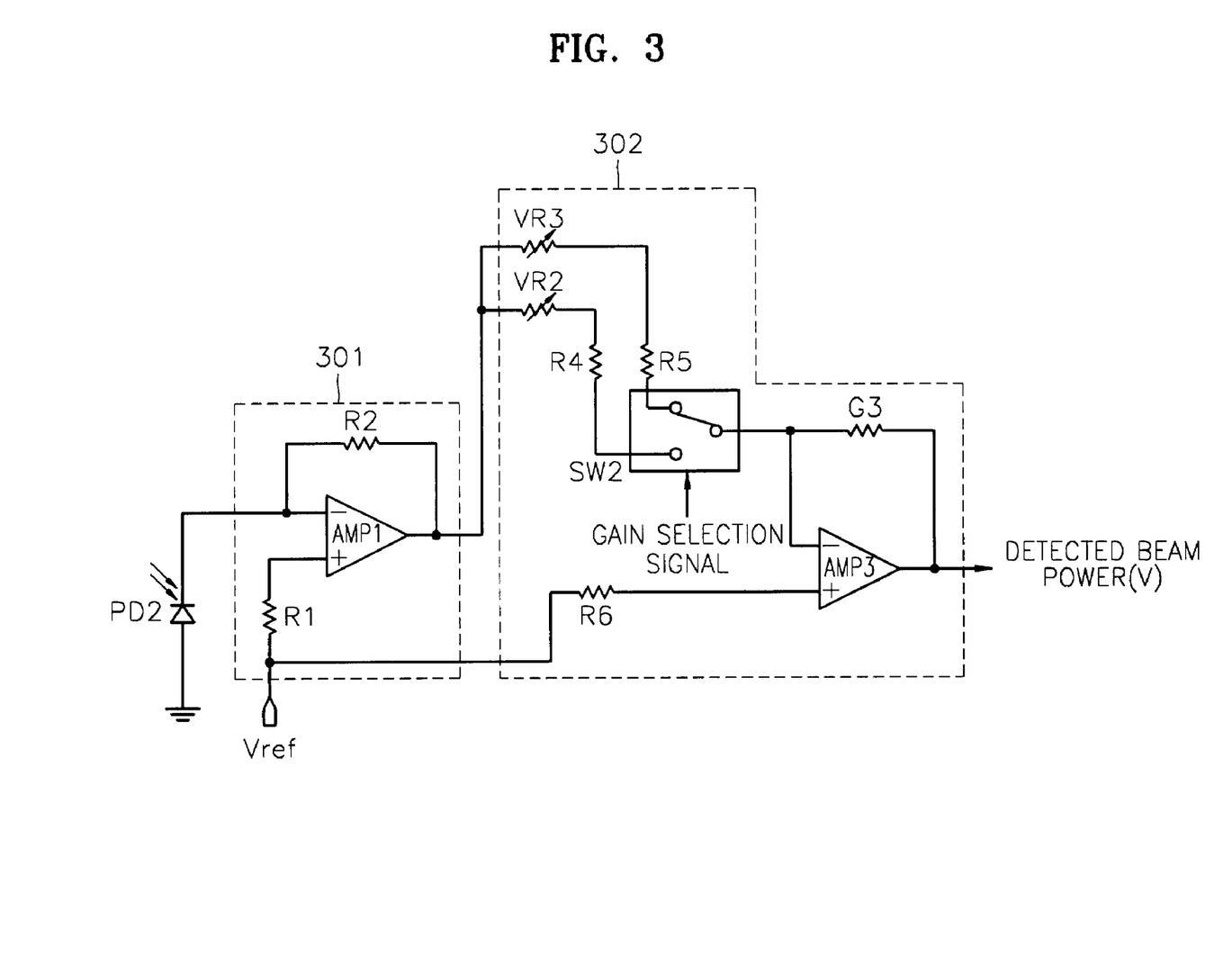
FIG. 3 is a diagram of a circuit of an apparatus for detecting the beam power in an optical drive according to another embodiment of the present invention.

FIG. 3 is a diagram of a circuit for detecting the beam power in an optical drive according to a second embodiment of the present invention. The circuit shown in FIG. 3 amplifies the beam power received according to a selected gain in response to a gain selection signal, which varies according to the type of optical medium used in the optical drive, and outputs the beam power amplified as the detected beam power. The circuit shown in FIG. 3 includes a photo diode PD2, an I/V amplifying unit 301 and an amplifying unit 302.

The structure and operations of the photo diode PD2 and the I/V amplifying unit 301 are the same as those of the photo diode PD1 and the I/V amplifying unit 201 of FIG. 2, and therefore, an explanation thereof will be omitted here.

The amplifying unit 302 includes an amplifier AMP3. In the amplifier AMP3, a bias resistance R6 is connected to an input terminal to which a reference voltage Vref is applied, and one feedback gain resistance G3 is connected to a feedback loop. In the amplifier AMP3, variable resistances VR2 and VR3 and invariable resistances R4 and R5 can be selectively connected to an input terminal, to which a voltage output from the I/V amplifying unit 301 is also applied by a gain selection signal.

The gain selection signal is generated according to the type of the optical medium used in the optical drive, using the variable resistances VR2 and VR3 and the invariable resistances R4 and R5. That is, a gain selection signal is generated to set the variable resistance VR2 and the invariable resistance R4 between the amplifier AMP3 and the I/V amplifying unit 301 in the case that the beam power in the optical medium used requires an amplification according to a gain, based on the feedback gain resistance G3, the variable resistance VR2, and the invariable resistance R4. On the other hand, a gain selection signal may be generated to set the variable resistance VR3 and the invariable resistance R5 between the amplifier AMP3 and the I/V amplifying unit 301 if the beam power in the optical medium used requires an amplification according to a gain, based on the feedback gain resistance G3, the variable resistance VR3, and the invariable resistance R5.

A switch SW2 is installed between the invariable resistances R4 and R5 and the input terminal of the amplifier AMP3, so that the variable resistances VR2 and the invariable resistance R4, or the variable resistance VR3 and the invariable resistance R5, can be set between the amplifier AMP3 and the I/V amplifying unit 301 in response to the gain selection signal. The values of the variable resistances VR2 and VR3 are determined so that light generated by one light source, selected out of the plurality of light sources, will have little scatter and linear characteristics, and the values of the invariable resistances R4 and R5 are determined based on the rate of the maximum beam power generated by different light sources.

Once an input line in which the variable resistance VR2 and an the resistance R4 are determined, in response to the gain selection signal being selected, a gain of the amplifying unit 302 has a value which divides the feedback gain resistance G3 by the sum of the variable resistance VR2 and the invariable resistance R4, i.e., G3/(VR2+R4). When an input line in which the variable resistance VR3 and the resistance R5 are determined, in response to the gain selection signal being selected, a gain of the amplifying unit 302 has a value which divides the feedback gain resistance G3 by the sum of the variable resistance VR3 and the invariable resistance R5, i.e., G3/(VR3+R5). Then, the amplifying unit 302 amplifies a voltage corresponding to the received beam power to a predetermined level by the gain. The amplified voltage is output as the detected beam power. The detected beam power can be used for the APC, as in FIG. 2.

Figure 4:
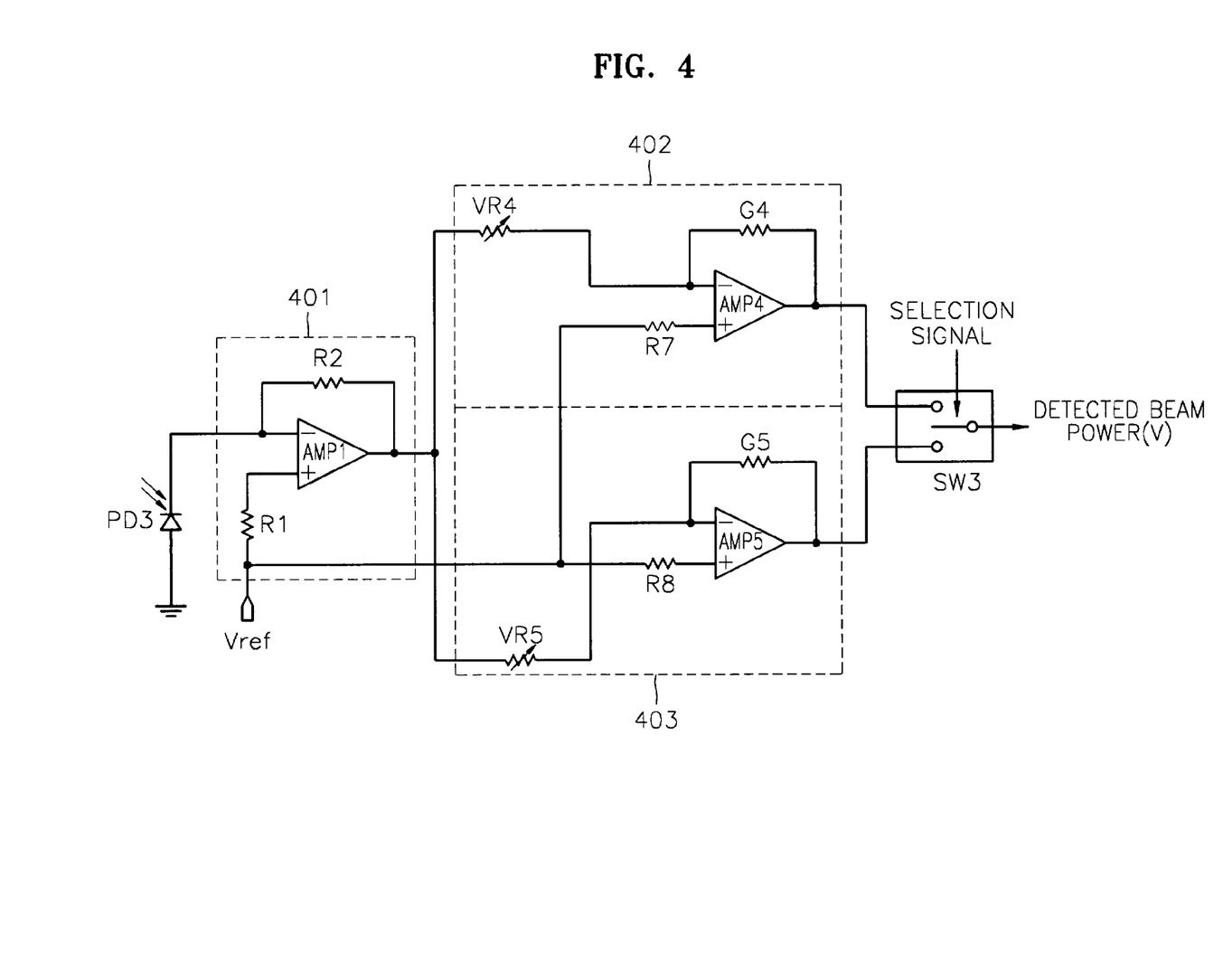
FIG. 4 is a diagram of a circuit of an apparatus for detecting the beam power in an optical drive according to still another embodiment of the present invention.

FIG. 4 is a diagram of a circuit for detecting the beam power in an optical drive according to a third embodiment of the present invention. The circuit of FIG. 4 detects the beam power in an optical drive using a plurality of amplifying units that amplify light to a predetermined level according to a predetermined gain in consideration of a plurality of light sources, according to the type of an optical medium used in the optical drive.

The circuit of FIG. 4 includes a photo diode PD3, an I/V amplifying unit 401, first and second amplifying units 402 and 403, and a switch SW3.

The photo diode PD3 and the I/V amplifier 401 have the same structure and operations as the photo diode PD1 and the I/V amplifying unit 201, and therefore, an explanation thereof will be omitted here.

The first amplifying unit 402 includes an amplifier AMP4. In the amplifier AMP4, a bias resistance R7 is connected to an input terminal, to which a reference voltage Vref is applied, and a feedback gain resistance G4 is connected to a feedback loop. Also, a variable resistance VR4 is connected to an input terminal to which a voltage output from I/V amplifying unit 401 is applied. The value of the variable resistance VR4 is determined such that the corresponding light source generates light with little scatter and linear characteristics.

The first amplifying unit 402 amplifies a voltage output from the I/V amplifying unit 401 to a predetermined level according to a gain that divides the feedback gain resistance G4 by the variable resistance VR4, i.e., G4/VR4, and outputs the resultant. The voltage output from the first amplifying unit 402 is sent to one of the terminals of the switch SW3.

The second amplifying unit 403 includes an amplifier AMP5. In the amplifier AMP5, a bias resistance R8 is connected to an input terminal to which a reference voltage Vref is applied, with a feedback gain resistance G5 being connected to a feedback loop. Also, a variable resistance VR5 is connected to an input terminal to which a voltage output from the I/V amplifying unit 401 is applied. The value of the variable resistance VR5 is determined so that a light generated by the corresponding light source has little scatter and linear characteristics.

Therefore, the second amplifying unit 403 amplifies a voltage output from the I/V amplifier 401 to a predetermined level according to a gain that divides the feedback gain resistance G5 by the variable resistance VR5, i.e., G5/VR5, and outputs the voltage. The voltage output from the second amplifying unit 402 is sent to the other terminal of the switch SW3.

The switch SW3 selects one of a signal output from the first amplifying unit 402 and a signal output from the second amplifying unit 403, in response to a selection signal, and outputs the selected signal. At this time, the signal output corresponds to the detected beam power. The selection signal is the same as the gain selection signal and is generated differently according to the type of an optical medium used in the optical drive.

Figure 5:
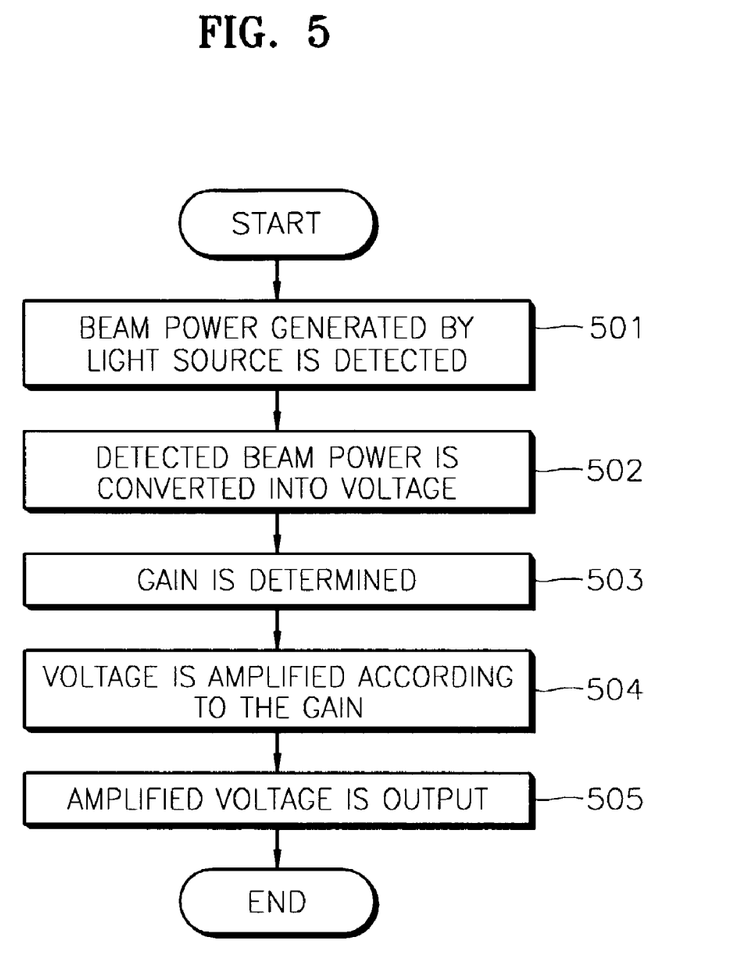
FIG. 5 is a flowchart of a method for detecting the beam power in an optical drive according to embodiments of the present invention.

FIG. 5 is a flowchart for detecting the beam power in an optical drive according to embodiments of the present invention. In the method of FIG. 5, the beam power for an optical drive is detected by a gain determined according to the type of an optical medium used in the optical drive.

In detail, the beam power generated by one of a plurality of light sources is detected using a light-receiving device such as a photo diode (Step 501). Next, the detected beam power is converted into a voltage as explained in the I/V amplifying unit 201 with reference to FIG. 2 (Step 502).

Thereafter, a gain is determined according to the type of an optical medium operating in the optical drive (Step 503). Then, the voltage is amplified to a predetermined level according to the gain (Step 504). Lastly, the amplified voltage is output (Step 505).

In a method for detecting the beam power in an optical drive according to embodiments of the present invention, when the beam power is detected by one light-receiving device, the detected beam power may be amplified and output according to a predetermined gain based on the number of the light sources in the optical drive, noting that light sources for optical media other than CDs and DVDs may be utilized. For example, in the above third embodiment as illustrated in FIG. 4, in the event that only two light sources are included in the optical drive, the beam power received is amplified and output according to a gain which is determined to be proper to one light source, and then the beam power received is amplified and output according to a gain which is determined to be proper to the other light source. In addition, one of these amplified beam powers that are amplified and output as described above, may be selected and output as the detected beam power.

Figure 6:
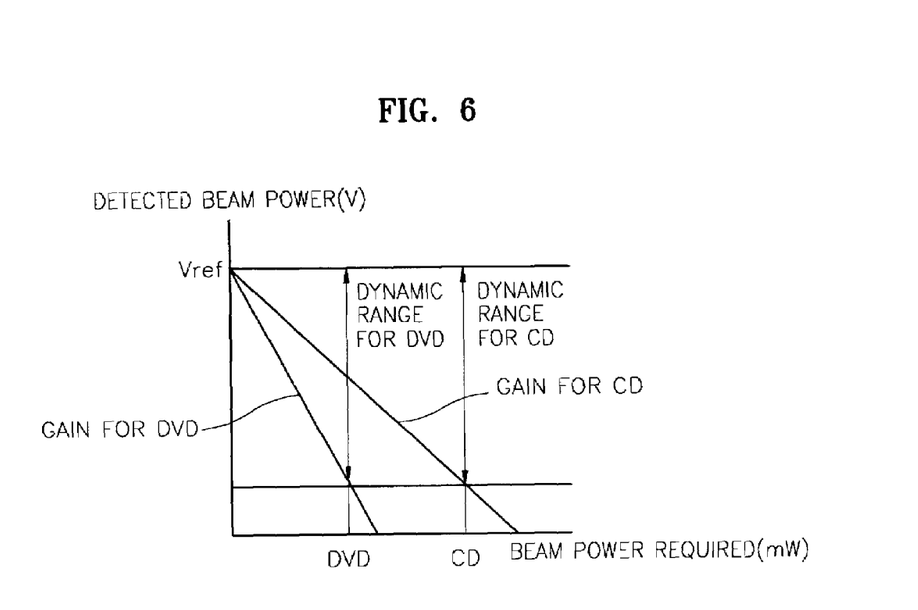
FIG. 6 is an illustration of a graph of a relationship between optical powers provided by an optical drive having light sources for both a CD and DVD, and the output of a monitor photo diode (MPD) according to embodiments of the present invention.

In detecting the beam power in an optical drive having light sources for a CD and a DVD, according to the embodiments of the present invention, the relationship between the beam power required in the respective light sources (which is illustrated on an axis of X of FIG. 6) and the detected beam power (which is illustrated on an axis of Y of FIG. 6) is as shown in FIG. 6. Referring to FIG. 6, it is noted that a sufficient dynamic range for detecting the maximum beam power can be ensured by controlling the amplification gain of the amplified beam power generated by different light sources.

As described above, in an optical drive having a plurality of light sources, detected beam power is amplified by a gain determined according to the characteristics of the respective light sources when the beam power generated by a light source is detected via a light detecting device. Therefore, it is possible to provide the beam power detected in consideration of a sufficient dynamic range for each light source, thereby realizing effective APC.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A monitoring apparatus to monitor respective output levels of at least a first light source and a second light source in an optical recording device, the first light source being configured to produce a first light beam at a first recording power level suitable for optically recording a first type of recording medium, and the second light source being configured to produce a second light beam at a second recording power level suitable for optically recording a second type of recording medium, with the first recording power level and the second recording power level being different from each other, the monitoring apparatus producing an amplified detection signal representing the monitored output levels for use by the optical recording device to maintain the first light beam at the first recording power level and the second light beam at the second recording power level, respectively, the monitoring apparatus comprising:

a light receiving unit to receive, and produce a proportional detection signal in response to, at least one of at least a portion of the first light beam and at least a portion of the second light beam; and an amplification unit having at least a first gain and a second gain, the first gain and the second gain being different from each other, with the amplification unit being configured to receive the detection signal, and to selectively apply to the detection signal one of the first gain and the second gain, to produce the amplified detection signal, the amplified detection signal having a first dynamic range when the first gain is applied to the detection signal resulting from detection of the portion of the first light beam and a second dynamic range when the second gain is applied to the detection signal resulting from detection of the portion of the first light beam, and with the first gain being predetermined such that the first dynamic range is wider than the second dynamic range.

2. The monitoring apparatus of claim 1, wherein the first gain is predetermined such that the first dynamic range is maximized.

3. The monitoring apparatus of claim 1, wherein the amplification unit further comprises a first gain adjustment circuit to vary the first gain and a second gain adjustment circuit to vary the second gain.

4. The monitoring apparatus of claim 3, wherein the first adjustment circuit comprises a first variable resistor and the second adjustment circuit comprises a second variable resistor.

5. The monitoring apparatus of claim 3, wherein the first adjustment circuit and the second adjustment circuit each vary the first gain and the second gain, respectively, independent of each other.

6. The monitoring apparatus of claim 1, wherein the amplification unit further comprises:

an input terminal to receive the detention signal;

an output terminal to output the amplified detection signal, the input terminal being operably coupled to the output terminal through at least a first signal path and a second signal path; and a switch disposed between the input terminal and the output terminal, with the switch having at least a first position and a second position, the first position forming the first signal path between the input terminal and the output terminal, and the second position forming the second signal path between the input terminal and the output terminal.

7. The monitoring apparatus of claim 6, wherein the amplification unit further comprises a control input terminal to receive a type indication signal indicating which one of the first type recording medium or the second type recording medium is being recorded to, the switch being switched between the first position and the second position based on the type indication signal, to select between the first gain and the second gain, respectively.

8. The monitoring apparatus of claim 6, wherein the first signal path comprises at least a first resistance and the second signal path comprises at least a second resistance, different from the first resistance.

9. The monitoring apparatus of claim 8, wherein:

the first resistance comprises a first variable resistor and a first invariable resistor, with the first variable resistor allowing adjustment of the first gain; and the second resistance comprises a second variable resistor and a second invariable resistor, with the second variable resistor allowing adjustment of the second gain.

10. The monitoring apparatus of claim 9, wherein the first variable resistor and the second variable resistor each vary the first gain and the second gain, respectively, independent of each other.

11. The monitoring apparatus of claim 6, wherein the amplification unit further comprises:
an amplifier circuit having a first input, a second input, and an output, with the first input being operably coupled to a predetermined reference voltage, the second input being operably coupled to the detection signal, with the output being coupled to the detection signal through a first feedback resistance when the switch is in the first position, and the output being coupled to the detection signal through a second feedback resistance when the switch is in the second position.

12. The monitoring apparatus of claim 11, wherein:
the first feedback resistance comprises a first variable resistor and a first invariable resistor, with the first variable resistor allowing adjustment of the first gain; and
the second feedback resistance comprises a second variable resistor and a second invariable resistor, with the second variable resistor allowing adjustment of the second gain.

13. The monitoring apparatus of claim 12, wherein the first variable resistor and the second variable resistor each vary the first gain and the second gain, respectively, independent of each other.

14. A monitoring apparatus to monitor at least a first light beam from a first light source and a second light beam from a second light source, and to produce an amplified detection signal representing respective output levels of the first light beam and the second light beam, the monitoring apparatus comprising:
a light receiving unit to receive at least one of at least a portion of the first light beam and at least a portion of the second light beam, and to produce a proportional detection signal in response to the received at least one of at least a portion of the first light beam and at least a portion of the second light beam; and
an amplification unit having at least a first gain and a second gain, the first gain and the second gain being different from each other, with the amplification unit being configured to receive the detection signal, and to selectively apply to the detection signal one of the first gain and the second gain, to produce the amplified detection signal, the amplification unit further comprising a first gain adjustment circuit to vary the first gain and a second gain adjustment circuit to vary the second gain.

15. The monitoring apparatus for monitoring the output levels of claim 14, wherein the amplification unit further comprises:
an input terminal to receive the detection signal;
an output terminal to output the amplified detection signal, the input terminal being operably coupled to the output terminal through at least a first signal path and a second signal path; and
a switch disposed between the input terminal and the output terminal, the switch having at least a first position and a second position, the first position forming the first signal path between the input terminal and the output terminal and the second position forming the second signal path between the input terminal and the output terminal.

16. The monitoring apparatus of claim 15, wherein the amplification unit further comprises;
a control input terminal to receive a type indication signal indicating which one of the first type recording medium or the second type recording medium is being recorded to, with the switch being switched between the first position and the second position based on the type indication signal, to select between the first gain and the second gain, respectively.

17. The monitoring apparatus of claim 15, wherein the first signal path comprises at least a first resistance and the second signal path comprises at least a second resistance, different from the first resistance.

18. The monitoring apparatus of claim 17, wherein:
the first resistance comprises a first variable resistor and a first invariable resistor, with the first gain adjustment circuit further comprising the first variable resistor; and
the second resistance comprises a second variable resistor and a second invariable resistor, with the second gain adjustment circuit further comprising the second variable resistor.

19. The monitoring apparatus of claim 18, wherein the first variable resistor and the second variable resistor each vary the first gain and the second gain, respectively, independent of each other.

20. An optical recording device, comprising:
a first light source to produce a first light beam at a first recording power level suitable to optically record to a first type of recording medium;
a second light source to produce a second light beam at a second recording power level suitable to optically record to a second type of recording medium, the second recording power level being different from the first recording power level;
a power level monitoring circuit to produce an amplified detection signal representing respective monitored output power levels of at least one of the first light beam and the second light beam, the power level monitoring circuit further comprising:
a light receiving unit to receive, and to produce a proportional detection signal in response to, at least one of at least a portion of the first light beam and at least a portion of the second light beam; and
an amplification unit having at least a first gain and a second gain, the first gain and the second gain being different from each other, with the amplification unit being configured to receive the detection signal, and to selectively apply to the detection signal one of the first gain and the second gain, to produce the amplified detection signal, with the amplified detection signal having a first dynamic range when the first gain is applied to the detection signal resulting from detection of the portion of the first light beam, and with the amplified detection signal having a second dynamic range when the second gain is applied to the detection signal resulting from detection of the portion of the first light beam, with the first gain being predetermined such that the first dynamic range is wider than the second dynamic range; and
an automatic power control unit to adjust an output power level of at least one of the first light source and the second light source based on the amplified detection signal to maintain the output power level of the first light source substantially at the first recording power level and the output power level of the second light source substantially at the second recording power level.

21. The optical recording device of claim 20, wherein the first gain is predetermined such that the first dynamic range is maximized.

22. The optical recording device of claim 20, wherein the amplification unit further comprises a first gain adjustment circuit to vary the first gain and a second gain adjustment circuit to vary the second gain.

23. The optical recording device of claim 22, wherein the first adjustment circuit comprises a first variable resistor and the second adjustment circuit comprises a second variable resistor.

24. The optical recording device of claim 22, wherein the first adjustment circuit and the second adjustment circuit each vary the first gain and the second gain, respectively, independent of each other.

25. The optical recording device of claim 20, wherein the amplification unit further comprises:
an input terminal to receive the detection signal;
an output terminal to output the amplified detection signal, the input terminal being operably coupled to the output terminal through at least a first signal path and a second signal path; and
a switch disposed between the input terminal and the output terminal, the switch having at least a first position and a second position, the first position forming the first signal path between the input terminal and the output terminal, and the second position forming the second signal path between the input terminal and the output terminal.

26. The optical recording device of claim 25, wherein the amplification unit further comprises:
a control input terminal to recieve a type indication signal indicating which one of the first type recording medium and the second type recording medium is being recorded to, the switch being switched between the first position and the second position based on the type indication signal, to select between the first gain and the second gain, respectively.

27. The optical recording device of claim 26, wherein the first signal path comprises at least a first resistance and a second resistance, different from the first resistance.

28. The optical recording device of claim 27, wherein the first resistance comprises a combination or a first variable resistor and a first invariable resistor, with the first variable resistor allowing for adjustment of the first gain and the second resistance comprises a second variable resistor and a second invariable resistor, the second variable resistor allowing for adjustment of the second gain.

29. The optical recording device of claim 28, wherein the first variable resistor and the second variable resistor each vary the first gain and the second gain, respectively, independent of each other.

30. The optical recording device of claim 25, wherein the amplification unit further comprises:
an amplifier circuit having a first input, a second input, and an output, with the first input being operably coupled to a predetermined reference voltage, the second input being operably coupled to the detection signal, with the output being coupled to the detection signal through a first feedback resistance when the switch is in the first position, and the output being coupled to the detection signal through a second feedback resistance when the switch is in the second position.

31. The optical recording device of claim 30, wherein the first feedback resistance comprises a first variable resistor and a first invariable resistor, with the first variable resistor allowing adjustment of the first gain and the second feedback resistance comprises a combination of a second variable resistor and a second invariable resistor, with the second variable resistor allowing adjustment of the second gain.

32. The optical recording device of claim 31, wherein the first variable resistor and the second variable resistor each vary the first gain and the second gain, respectively, independent of each other.

33. A recording and/or reproducing apparatus to record on or reproduce from an optical recording medium, comprising:
a first light source to produce a first light beam at a first desired power level suitable to optically read from and/or record to a first type of recording medium;
a second light source to produce a second light beam at a second desired power level suitable to optically read from and/or record to a second type of recording medium, with the second desired power level being different from the first desired power level; and
a light detection circuit configured to produce an amplified detection signal representing detection of at least one of the first light beam and the second light beam, the light detection circuit comprising:
a light receiving unit configured to receive at least one of at least a portion of the first light beam and at least a portion of the second light beam, and to produce a proportional detection signal in response to the received at least one of at least a portion of the first light beam and at least a portion of the second light beam; and
an amplification unit having at least a first gain and a second gain, the first gain and the second gain being different from each other, the amplification unit being configured to receive the detection signal, and to selectively apply to the detection signal one of the first gain and the second gain to produce the amplified detection signal, the amplification unit further comprising a first gain adjustment circuit to vary the first gain and a second gain adjustment circuit to vary the second gain.

34. The recording and/or reproducing apparatus of claim 33, further comprising:
an automatic power control unit to adjust an output power level of at least one of the first light source and the second light source based on the amplified detection signal to maintain the output power level of the first light source substantially at the first desired power level and the output power level of the second light source substantially at the second desired power level.

35. The recording and/or reproducing apparatus of claim 33, further comprising:
an input terminal to receive the detection signal;
an output terminal to output the amplified detection signal, with the input terminal being operably coupled to the output terminal through at least a first signal path and a second signal path; and
a switch disposed between the input terminal and the output terminal, the switch having at least a first position and a second position, the first position forming the first signal path between the input terminal and the output terminal, and the second position forming the second signal path between the input terminal and the output terminal.

36. The recording and/or reproducing apparatus of claim 35, wherein the amplification unit further comprises a control input terminal to receive a type indication signal indicating which one of the first type recording medium or the second type recording medium is being recorded to, the switch being switched between the first position and the second position based on the type indication signal, to select between the first gain and the second gain, respectively.

37. The recording and/or reproducing apparatus of claim 35, wherein the first signal path comprises at least a first resistance and the second signal path comprises at least a second resistance, different from the first resistance.

38. The recording and/or reproducing apparatus of claim 37, wherein:
the first resistance comprises a first variable resistor and a first invariable resistor, with the first gain adjustment circuit further comprising the first variable resistor; and
the second resistance comprises a second variable resistor and a second invariable resistor, with the second gain adjustment circuit further comprising the second variable resistor.

39. The recording and/or reproducing apparatus of claim 38, wherein the first variable resistor and the second variable resistor each vary the first gain and the second gain, respectively, independent of each other.

40. A monitoring method of monitoring respective output levels of at least a first light source and a second light source in an optical recording device, the first light source producing a first light beam at a first recording power level suitable for optically recording to a first type of recording medium, the second light source producing a second light beam at a second recording power level suitable for optically recording to a second type of recording medium, with the first recording power level and the second recording power level being different from each other, the monitoring method comprising:
predetermining a first gain suitable for use in monitoring the output level of the first light source;
predetermining a second gain suitable for use in monitoring the output level of the second light source;
determining which one of the first type of recording medium or the second recording medium is being recorded to;
detecting at least one of at least a portion of the first light beam and at least a portion of the second light beam;
producing a detection signal proportional to the detected at least one of at least a portion of the first light beam and at least a portion of the second light beam; and
selectively applying one of the first or second gains to the detection signal to produce an amplified detection signal, the first gain being applied when it is determined that the first type recording medium is being recorded to, and the second gain being applied when it is determined that the second type of recording medium is being recorded to, the amplified detection signal having a first dynamic range when the first gain is applied to the detection signal resulting from detection of the portion of the first light beam and the amplified detection signal having a second dynamic range when the second gain is applied to the detection signal resulting from detection of the portion of the first light beam,
wherein the first gain is predetermined such that the first dynamic range is wider than the second dynamic range.

41. The monitoring method of claim 40, wherein the first gain is predetermined such that the first dynamic range is maximized.

42. The monitoring method of claim 40, further comprising:
adjusting the first gain to improve a linearity characteristic of the amplified detection signal over the first dynamic range; and
adjusting the second gain to improve a linearity characteristic of the amplified detection signal over the second dynamic range.

43. A monitoring method of monitoring at least a first light source and a second light source in a device for recording to and/or reproducing from an optical recording medium, with the first light source being configured to produce a first light beam at a first desired power level suitable for optically recording to and/or reading from a first type of recording medium, the second light source being configured to produce a second light beam at a second desired power level suitable for optically recording to and/or reading from a second type of recording medium, the monitoring method comprising:
providing a first predetermined gain suitable for use in detecting the first light beam;
providing a second predetermined gain suitable for use in detecting the second light beam, the second predetermined gain being different from the first predetermined gain;
providing a first variable gain adjustment unit to adjust the first predetermined gain to produce a first adjusted gain;
providing a second variable gain adjustment unit to adjust the second predetermined gain to produce a second adjusted gain;
determining which one of the first type of recording medium or the second type of recording medium is being recorded to and/or read from;
detecting at least one of at least a portion of the first light beam and at least a portion of the second light beam;
producing a detection signal proportional to the detected at least one of at least a portion of the first light beam and at least a portion of the second light beam; and
selectively applying one of the first adjusted gain and the second adjusted gain to the detection signal to produce an amplified detection signal, the first adjusted gain being applied when it is determined that the first type recording medium is being recorded to or read from, and the second gain being applied when it is determined that the second type of recording medium is being recorded to and/or read from.

* * * * *

UNITED STATES PATENT AND TRADEMARK OFFICE
CERTIFICATE OF CORRECTION

PATENT NO. : 7,068,933 B2  Page 1 of 1
APPLICATION NO. : 10/197329
DATED : June 27, 2006
INVENTOR(S) : Pyong-yong Seong et al.

It is certified that error appears in the above-identified patent and that said Letters Patent is hereby corrected as shown below:

Column 11, Line 32, change "recieve" to --receive--.

Column 11, Line 39, change "claim 26," to --claim 25,--.

Column 12, Line 41, after "comprising" delete ":".

Signed and Sealed this

Nineteenth Day of December, 2006

JON W. DUDAS
*Director of the United States Patent and Trademark Office*